(12) United States Patent
Hosoda (10) Patent No.: US 10,275,864 B2
(45) Date of Patent: Apr. 30, 2019

(54) IMAGE PROCESSING DEVICE AND IMAGE PROCESSING METHOD

(71) Applicant: Kabushiki Kaisha Toshiba, Minato-ku, Tokyo (JP)

(72) Inventor: Sohichiroh Hosoda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 15/431,857

(22) Filed: Feb. 14, 2017

(65) Prior Publication Data

US 2018/0075588 A1 Mar. 15, 2018

Related U.S. Application Data

(60) Provisional application No. 62/385,462, filed on Sep. 9, 2016.

(51) Int. Cl.

| G06T 5/00 | (2006.01) |
|---|---|
| H04N 5/347 | (2011.01) |
| G06T 5/20 | (2006.01) |
| H04N 9/77 | (2006.01) |
| H04N 9/64 | (2006.01) |
| H04N 9/04 | (2006.01) |
| H04N 9/07 | (2006.01) |

(52) U.S. Cl.
CPC .............. *G06T 5/008* (2013.01); *G06T 5/002* (2013.01); *G06T 5/20* (2013.01); *H04N 5/347* (2013.01); *H04N 9/646* (2013.01); *H04N 9/77* (2013.01); *G06T 2207/20024* (2013.01); *G06T 2207/20208* (2013.01); *H04N 9/045* (2013.01); *H04N 9/07* (2013.01)

(58) Field of Classification Search
CPC ......... G06T 5/008; G06T 5/002; H04N 5/347; H04N 9/77
See application file for complete search history.

(56) References Cited

U.S. PATENT DOCUMENTS

| 8,982,963 B2 | 3/2015 | Gish et al. | |
|---|---|---|---|
| 9,299,317 B2 | 3/2016 | Ward | |
| 2009/0161953 A1* | 6/2009 | Ciurea | H04N 1/4074 382/172 |
| 2009/0226110 A1* | 9/2009 | Chen | H04N 7/0132 382/263 |
| 2010/0157078 A1* | 6/2010 | Atanassov | G06T 5/007 348/222.1 |

(Continued)

FOREIGN PATENT DOCUMENTS

| JP | 2012-520619 A | 9/2012 |
|---|---|---|
| JP | 2014-510339 A | 4/2014 |
| JP | 2015-529890 A | 10/2015 |

*Primary Examiner* — Abdelaaziz Tissire
(74) *Attorney, Agent, or Firm* — White & Case LLP (57) ABSTRACT

According to one embodiment, an image processing device includes a luminance acquiring unit and a local tone-mapping unit. The luminance acquiring unit acquires a luminance signal of a target pixel in an image by performing filter processing on an image signal. The luminance acquiring unit generates a luminance signal by blending a first luminance-filter result obtained by a first luminance filter and a second luminance-filter result obtained by a second luminance filter. The local tone-mapping unit performs local tone mapping of the luminance signal.

19 Claims, 9 Drawing Sheets

(56) References Cited

U.S. PATENT DOCUMENTS

| | | | |
|---|---|---|---|
| 2010/0166301 A1* | 7/2010 | Jeon | G06T 5/009 382/162 |
| 2010/0177203 A1* | 7/2010 | Lin | H04N 5/23229 348/222.1 |
| 2011/0235945 A1* | 9/2011 | Wakazono | H04N 5/217 382/300 |
| 2011/0285737 A1* | 11/2011 | Lin | G09G 5/10 345/589 |
| 2012/0236020 A1* | 9/2012 | Paris | G06T 5/009 345/589 |
| 2013/0100178 A1* | 4/2013 | Ninan | G06T 5/009 345/690 |
| 2015/0062368 A1* | 3/2015 | Li | G06T 5/50 348/222.1 |
| 2015/0221280 A1 | 8/2015 | Van Der Vleuten | |
| 2015/0302564 A1* | 10/2015 | Ho | G06T 5/20 382/167 |
| 2016/0027160 A1* | 1/2016 | Aydin | G06T 5/40 382/162 |
| 2016/0328830 A1* | 11/2016 | Pouli | H04N 5/57 |
| 2017/0061590 A1* | 3/2017 | Chamaret | G06T 5/007 |

\* cited by examiner

```
std::sort(h, h+3); std::sort(v, v+3);
int cmax = std::max(h[2], v[2]); int cmin = std::min(h[0], v[0]);
int Ycont = std::min(1024 , (Yamp*((cmax+1)/(cmin+1))) );
```

```
std::sort(h, h+64); std::sort(v, v+64);
int cmax = std::max(h[63], v[63]); int cmin = std::min(h[0], v[0]);
int Scont = std::min(1024 , (Samp*((cmax+1)/(cmin+1))) );
```

FIG.15

IMAGE PROCESSING DEVICE AND IMAGE PROCESSING METHOD

CROSS-REFERENCE TO RELATED APPLICATIONS

This application is based upon and claims the benefit of priority from U.S. Provisional Application No. 62/385,462, filed on Sep. 9, 2016; the entire contents of which are incorporated herein by reference.

FIELD

Embodiments described herein relate generally to an image processing device and an image processing method.

BACKGROUND

Conventionally, there is known a technique of high dynamic range (HDR) compression, which reduces a data amount per pixel of an input image and compresses a gradation range of the input image having a wide dynamic range. An image processing device is desired to realize HDR compression suitable for luminance distribution in every region of the input image.

DETAILED DESCRIPTION

In general, according to one embodiment, an image processing device includes a luminance acquiring unit and a local tone-mapping unit. The luminance acquiring unit acquires a luminance signal of a target pixel in an image by performing filter processing on an image signal. The luminance acquiring unit generates the luminance signal by blending a first luminance-filter result obtained by a first luminance filter and a second luminance-filter result obtained by a second luminance filter. The local tone-mapping unit performs local tone mapping of the luminance signal.

Exemplary embodiments of an image processing device and an image processing method will be explained below in detail with reference to the accompanying drawings. The present invention is not limited to the following embodiments.

Figure 1:
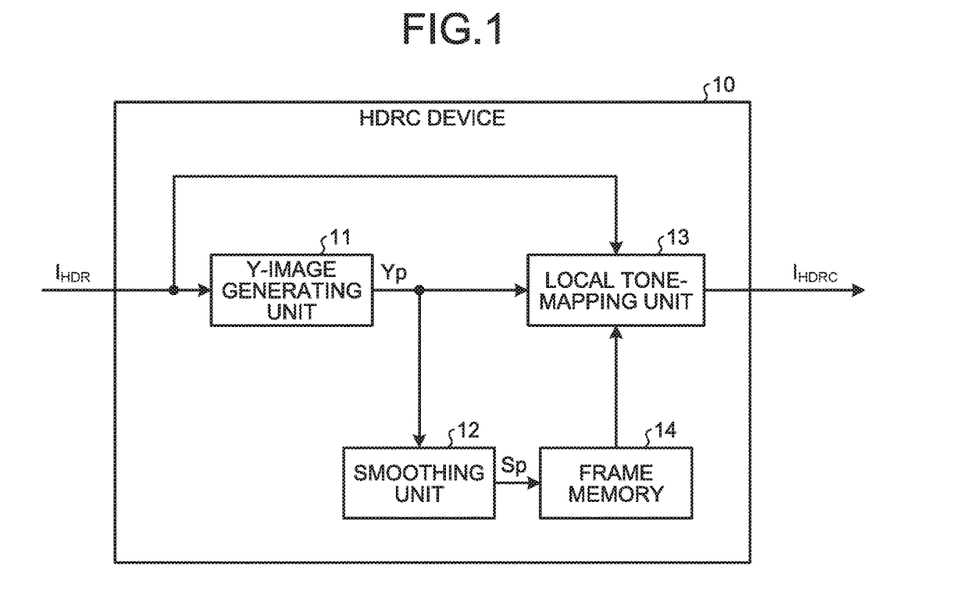
FIG. 1 is a block diagram of a high dynamic range compression (HDRC) device that is an image processing device according to an embodiment.

FIG. 1 is a block diagram of a high dynamic range compression (HDRC) device that is an image processing device according to an embodiment. An HDRC device 10 compresses an image signal in a luminance space. The HDRC device 10 according to the embodiment realizes HDR compression suitable for luminance distribution in every region of an image and therefore obtains an HDR compressed image that achieves both the fine gradation and the smoothness. To achieve the smoothness is to reduce noise in a flat portion in which the change of the luminance value is small.

An HDR image signal ($I_{HDR}$) that is RAW data is input to the HDRC device 10. The signal $I_{HDR}$ has a data amount that enables gradation representation with a wider dynamic range as compared with an image signal acquired by normal imaging. An HDR image that is an input image is obtained by synthesizing images with mutually different exposure levels or images with mutually different gains.

The HDRC device 10 includes a Y-image generating unit 11, a smoothing unit 12, a local tone-mapping unit 13, and a frame memory 14. FIG. 1 illustrates a hardware configuration of the HDRC device 10. The Y-image generating unit 11, the smoothing unit 12, the local tone-mapping unit 13, and the frame memory 14 served as hardware modules are mounted in the HDRC device 10.

The Y-image generating unit 11 as a luminance acquiring unit acquires a luminance signal Yp of a target pixel in the HDR image from the signal $I_{HDR}$. The Y-image generating unit 11 generates a luminance image formed by luminance information (Y) of the HDR image. The Y-image generating unit 11 outputs the luminance signal Yp to the smoothing unit 12 and the local tone-mapping unit 13.

The smoothing unit 12 performs processing of smoothing luminance distribution of a luminance image on the luminance signal Yp to generate a smoothed signal Sp. The frame memory 14 holds the smoothed signal Sp generated in the smoothing unit 12.

The local tone-mapping unit 13 performs local tone mapping of the luminance signal Yp to adjust a dynamic range of the signal $I_{HDR}$. The local tone-mapping unit 13 refers to the smoothed signal Sp read out from the frame memory 14 to perform processing.

The local tone-mapping unit 13 converts a pixel value of the HDR image signal to a pixel value in a compressed gradation range. The local tone-mapping unit 13 outputs an HDRC image signal ($I_{HDRC}$) after being subjected to dynamic range adjustment. The local tone-mapping unit 13 performs adjustment that reduces the dynamic range of the entire HDR image while maintaining a local contrast of the HDR image.

Figure 2:
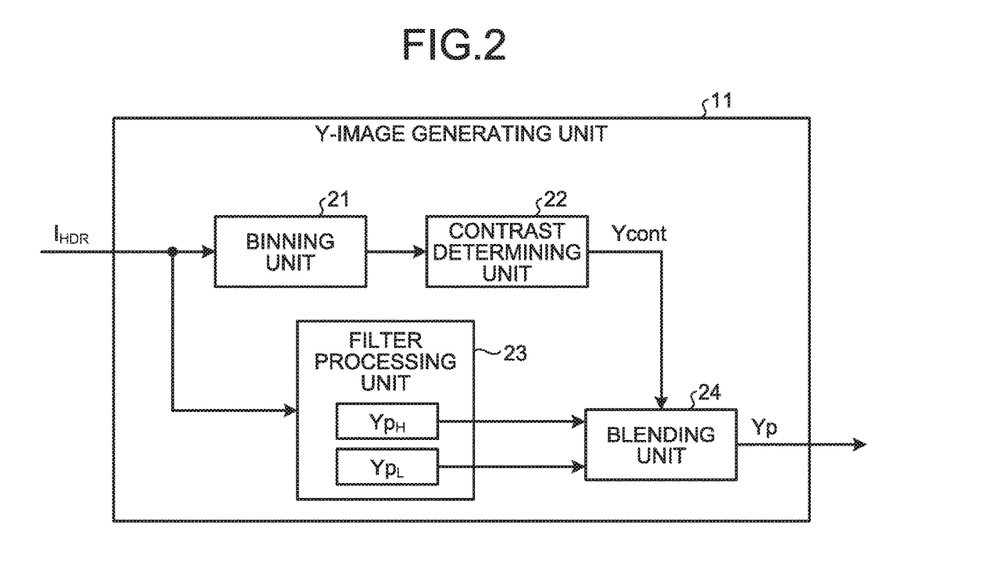
FIG. 2 is a block diagram of a Y-image generating unit illustrated in FIG. 1.

FIG. 2 is a block diagram of the Y-image generating unit 11. The Y-image generating unit 11 is provided with various logic circuits and storage elements to store operation results and various data. The Y-image generating unit 11 includes a binning unit 21, a contrast determining unit 22, a filter processing unit 23, and a blending unit 24 that are processing circuits.

The binning unit 21 performs binning processing on an HDR image signal. The contrast determining unit 22 calculates a contrast evaluation value (Ycont) that is a result of evaluation of a contrast in a region including a target pixel and its surroundings.

The filter processing unit 23 performs processing that uses a first luminance filter to calculate a luminance value of a target pixel and processing that uses a second luminance filter to calculate the luminance value of the target pixel. The first luminance filter and the second luminance filter are different from each other in transfer characteristics with respect to a change of the luminance value.

The first luminance filter is a high-resolution luminance filter performing processing that focuses on maintaining a luminance change in a portion where the change of the luminance value is large. The first luminance filter has characteristics that enable a luminance change in an image signal to be transferred in high fidelity. The second luminance filter is a low-resolution luminance filter performing processing that focuses on maintaining a flat portion in which the change of the luminance value is small and reducing an influence of noise. The second luminance filter has characteristics that enable a signal-to-noise ratio (SNR) of the image signal to be maintained or increased.

The filter processing unit 23 outputs a first luminance-filter result ($Yp_H$) by the first luminance filter and a second luminance-filter result ($Yp_L$) by the second luminance filter.

The blending unit 24 performs blending processing of blending the results $Yp_H$ and $Yp_L$. The blending unit 24 adjusts the ratio of blending the results $Yp_H$ and $Yp_L$ in accordance with the value Ycont. The blending unit 24 outputs a luminance signal Yp that is a result of the blending.

Figure 3:
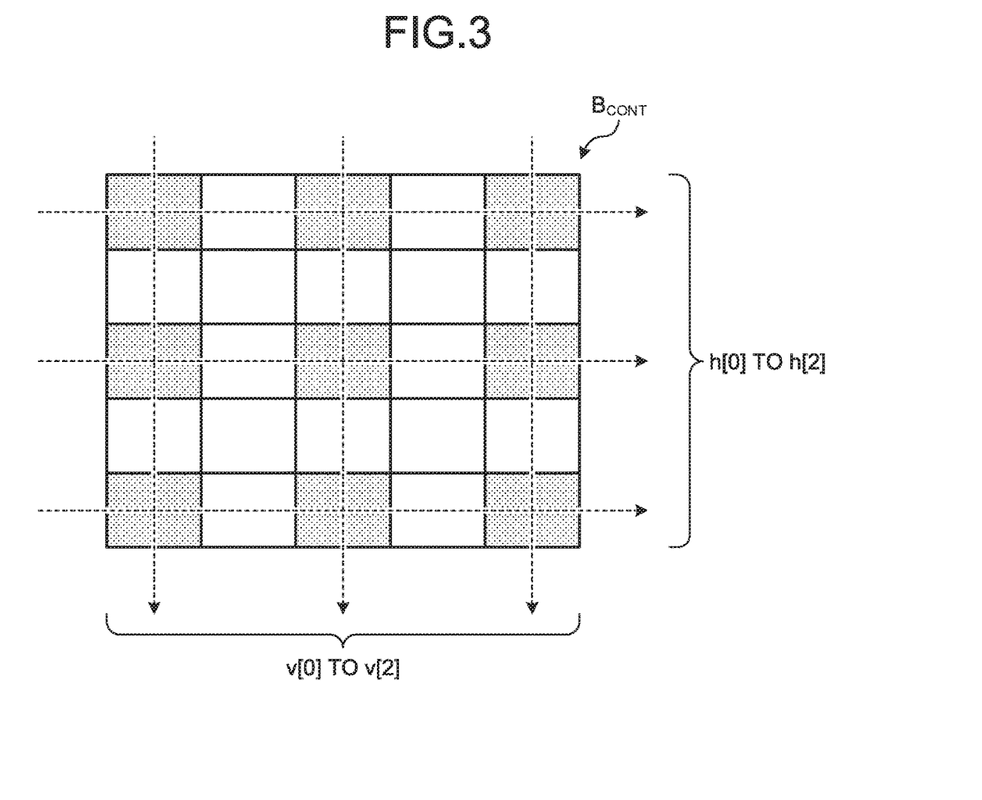
FIG. 3 is an explanatory diagram of processing in a binning unit and a contrast determining unit illustrated in FIG. 2.

FIG. 3 is an explanatory diagram of processing in the binning unit 21 and the contrast determining unit 22. In an HDR image signal, signals that indicate pixel values of respective colors including R (red), G (green), and B (blue) are arranged in a predetermined arrangement order, for example, an order in accordance with a Bayer arrangement of an image sensor.

A pixel array of an image sensor includes pixels arranged in a horizontal direction and a vertical direction. A unit arrangement of the Bayer arrangement is formed by a 2×2 pixel block. An R pixel detecting R-light and a B pixel detecting B-light are arranged at positions of one diagonal in this pixel block. A Gr pixel and a Gb pixel that detect G-light are arranged at positions of the other diagonal in the pixel block. The Gr pixel is adjacent to the R pixel in the horizontal direction. The Gb pixel is adjacent to the B pixel in the horizontal direction.

The binning unit 21 obtains representative values of pixel values for respective colors in every predetermined binning range. For example, assuming that n is any of 1, 2, 4, 8, 16, 32, and 64, the binning unit 21 performs n×n binning. In a case of n=2, the binning unit 21 calculates, with regard to a binning range in which two Gr pixels are arranged in the horizontal direction and two Gr pixels are arranged in the vertical direction, a representative value of the four Gr pixels. Similarly, for a pixel other than the Gr pixel, the binning unit 21 calculates a representative value in every binning range.

The representative value can be any of values obtained based on pixel values, for example, an average value or a center value of the pixel values. The binning unit 21 can employ, as it is, a pixel value of a pixel located at a predetermined position in the binning range as the representative value.

The Y-image generating unit 11 can reduce an amount of data held for contrast determination by performing the binning processing. The value of n is a set value stored in a predetermined register. The value of n can be changed as appropriate by setting by a user. In a case of n=1, the binning processing in the binning unit 21 is not performed. In the Y-image generating unit 11, the binning unit 21 can be omitted.

A pixel block $B_{CONT}$ illustrated in FIG. 3 represents a range in which pixel values are referred to in contrast determination with regard to one target pixel. A unit region of the pixel block $B_{CONT}$ is assumed to be a region corresponding to the binning range. The representative value obtained by the binning processing is calculated in every unit region. In a case where the binning processing is not performed, the unit region corresponds to a pixel and a pixel value as the representative value is set in every unit region.

25 unit regions are arranged in a 5×5 matrix format in the pixel block $B_{CONT}$ according to the embodiment. For example, hatched nine unit regions in the pixel block $B_{CONT}$ are assumed to be unit regions in which representative values of the Gr pixel as the target pixel are respectively calculated. The center of the pixel block $B_{CONT}$ is a unit region including the target pixel.

The contrast determining unit 22 uses the representative values of the target pixels in the nine unit regions to calculate a value Ycont that is a contrast evaluation value of the target pixel. Also in a case where the target pixel is an R pixel, a B pixel, or a Gb pixel, the contrast determining unit 22 calculates the value Ycont in a similar manner to that in the case where the target pixel is the Gr pixel. The contrast determining unit 22 uses representative values with regard to the same color component as that of the pixel value of the target pixel to calculate the value Ycont of the target pixel.

Figure 4:
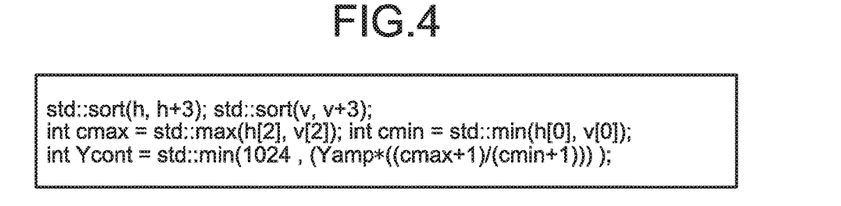
FIG. 4 is a diagram illustrating an example of a program code describing processing contents in the contrast determining unit.

FIG. 4 is a diagram illustrating an example of a program code describing processing contents in the contrast determining unit 22. The contrast determining unit 22 obtains an average value of representative values in unit regions arranged in the horizontal direction in the pixel block $B_{CONT}$. A rightward broken arrow illustrated in FIG. 3 indicates that representative values in the hatched three unit regions are averaged.

The contrast determining unit 22 obtains three average values with regard to the horizontal direction for one pixel block $B_{CONT}$. The contrast determining unit 22 sorts the three average values in an ascending order by a function "sort(h, h+3)". A minimum value and a maximum value of the three average values are respectively defined as h[0] and h[2].

The contrast determining unit 22 obtains an average value of representative values in unit regions arranged in the vertical direction in the pixel block $B_{CONT}$. A downward broken arrow illustrated in FIG. 3 indicates that representative values in the hatched three unit regions are averaged.

For example, assuming that a pixel value is represented by 16 bits in the signal $I_{HDR}$, the contrast determining unit 22 obtains average values of high-order 10 bits of the representative values. The contrast determining unit 22 can be provided with a line memory for referring to representative values in unit regions arranged in the vertical direction.

The contrast determining unit 22 obtains three average values with regard to the vertical direction for one pixel block $B_{CONT}$. The contrast determining unit 22 sorts the three average values in an ascending order by a function "sort(v, v+3)". A minimum value and a maximum value of the three average values are respectively defined as v[0] and v[2].

Subsequently, the contrast determining unit 22 substitutes a larger one of the values h[2] and v[2] for cmax and substitutes a smaller one of the values h[0] and v[0] for cmin. The contrast determining unit 22 substitutes a smaller one of a value that is obtained by multiplying (cmax+1)/(cmin+1) by a value Yamp, and 1024 for the value Ycont. The value Yamp is an amplifying coefficient. Here, (cmax+1)/(cmin+1) represents a result of measurement of a contrast that is a ratio of a maximum value and a minimum value of the luminance values in the pixel block $B_{CONT}$. In this example, the value Ycont can be from 1 to 1024.

The value Yamp is a coefficient for contrast adjustment, and is stored in a register, for example. The value Yamp can be changed as appropriate by setting by a user. The value Yamp is assumed to be 1 in this example. 1024 is a constant representing the maximum value of the contrast that can be represented by 10-bit data. As the constant, a value other than 1024 can be set in accordance with the number of bits of data and the value Yamp.

The program code executed in calculation of the contrast evaluation value is not limited to one illustrated in FIG. 4, but can be changed as appropriate. The contrast determining unit 22 can calculate the contrast evaluation value by any method.

The filter processing unit 23 performs processing on an HDR image signal by the first luminance filter to calculate a filter result ($Yp_H$) for a target pixel. The filter processing unit 23 performs processing on the HDR image signal by the second luminance filter to calculate a filter result ($Yp_L$) for the target pixel.

The blending unit 24 obtains a luminance signal Yp indicating a luminance value of the target pixel by the following operation, for example. ">>10" represents bit shift to right by 10 bits. The number of bits shifted can be changed as appropriate in accordance with the number of bits of the value Ycont. Further, a value other than 1024 can be set as a constant in accordance with the number of bits of the value Ycont.

$$Yp=((Ycont \times Yp_H)+((1024-Ycont) \times Yp_L))>>10$$

The Y-image generating unit 11 calculates, by blending processing, the luminance signal Yp on which characteristics of the first luminance filter are reflected more strongly as a contrast in the target pixel and its surroundings is higher. The Y-image generating unit 11 can obtain the luminance signal Yp that focuses on maintaining a luminance change in a portion where the change of the luminance value is large.

The Y-image generating unit 11 calculates the luminance signal Yp on which characteristics of the second luminance filter are reflected more strongly as the contrast in the target pixel and its surroundings is lower. The Y-image generating unit 11 can obtain the luminance signal Yp that focuses on maintaining or increasing an SNR in a portion where the change of the luminance value is small.

The Y-image generating unit 11 can perform filter processing adapted to a luminance change in every region of an image, as compared with a case where a luminance filter having constant characteristics is applied irrespective of the luminance change in every region. The Y-image generating unit 11 can generate a luminance image with the fine gradation and reduced noise by an operation suitable for the contrast in every region.

Figure 5:
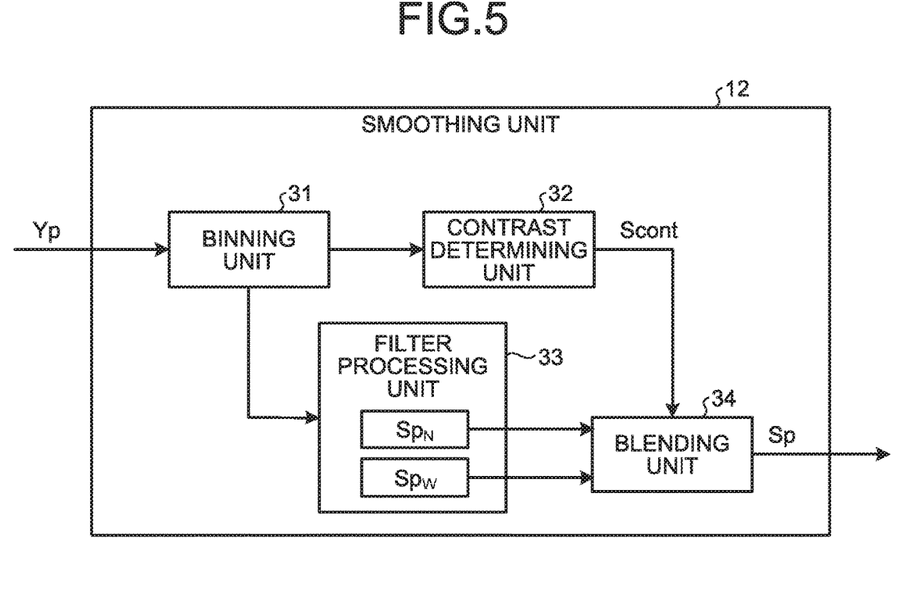
FIG. 5 is a block diagram of a smoothing unit illustrated in FIG. 1.

FIG. 5 is a block diagram of the smoothing unit 12. The smoothing unit 12 is provided with various logic circuits and storage elements to store operation results and various data. The smoothing unit 12 includes a binning unit 31, a contrast determining unit 32, a filter processing unit 33, and a blending unit 34 that are processing circuits.

The binning unit 31 performs binning processing on the luminance signal Yp. The contrast determining unit 32 calculates a contrast evaluation value (Scont) that is a result of determination of a contrast in a region including a target pixel and its surroundings.

The filter processing unit 33 performs processing to smoothen luminance distribution by using a first smoothing filter and processing to smoothen the luminance distribution by using a second smoothing filter. In the processes on a luminance signal of the target pixel by the first and second smoothing filters, the ranges, in which the luminance values are referred to, are different from each other. The case where the ranges are different from each other covers that one of the ranges includes the others.

The first smoothing filter is a wideband smoothing filter that performs filter processing capable of forming luminance distribution with the smoothness by referring to luminance distribution in a wide range of an image. The second smoothing filter is a narrowband smoothing filter that performs filter processing capable of forming luminance distribution following a luminance change in the image by referring to luminance distribution in a narrow range of the image.

The filter processing unit 33 outputs a first smoothing-filter result ($Sp_W$) by using the first smoothing filter and a second smoothing-filter result ($Sp_N$) by using the second smoothing filter.

The blending unit 34 performs blending processing on the results $Sp_W$ and $Sp_N$ that are filter results. The blending unit 34 adjusts the ratio of blending the results $Sp_W$ and $Sp_N$ in accordance with the value Scont. The blending unit 34 outputs a smoothed signal Sp that is a result of blending the results $Sp_W$ and $Sp_N$.

Figure 6:
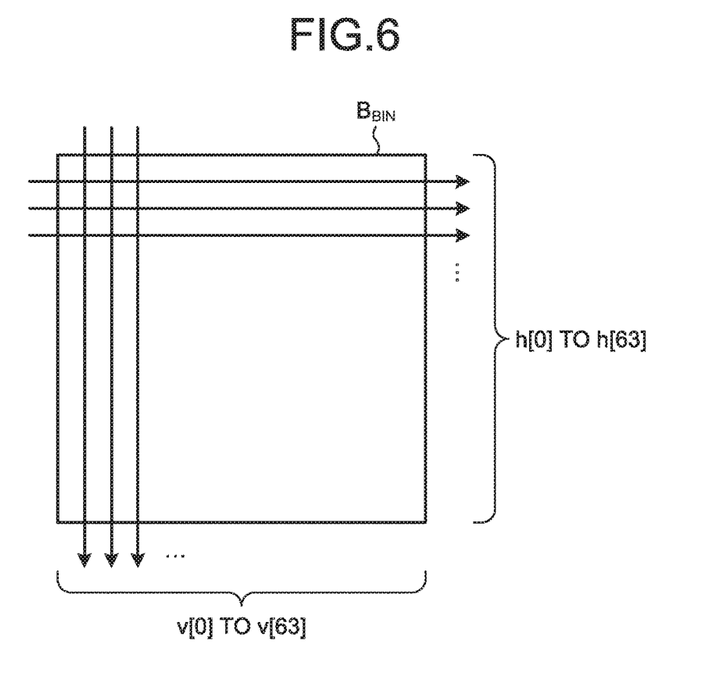
FIG. 6 is an explanatory diagram of processing in a binning unit and a contrast determining unit illustrated in FIG. 5.

Next, processing in the smoothing unit 12 is described. FIG. 6 is an explanatory diagram of processing in the binning unit 31 and the contrast determining unit 32. The binning unit 31 obtains a representative value of luminance values in every binning block $B_{BIN}$ that is a predetermined binning range.

The binning unit 31 performs 64×64 binning, for example. In this case, the binning block $B_{BIN}$ is a 64×64 pixel block. The smoothing unit 12 can reduce an amount of data held for filter processing, by performing binning processing.

The binning block $B_{BIN}$ is also a range in which pixel values are referred to in contrast determination for one target pixel. The contrast determining unit 32 takes in data in a process of an operation in the binning unit 31 and calculates the value Scont.

Figure 7:
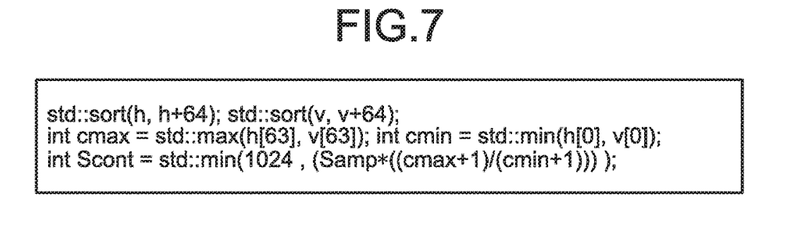
FIG. 7 is a diagram illustrating an example of a program code describing processing contents in the contrast determining unit.

FIG. 7 is a diagram illustrating an example of a program code describing processing contents in the contrast determining unit 32. The contrast determining unit 32 obtains an average value of luminance values in pixels arranged in the horizontal direction and an average value of luminance values in pixels arranged in the vertical direction in the binning block $B_{BIN}$. The contrast determining unit 32 obtains, for one binning block $B_{BIN}$, 64 average values with regard to the horizontal direction and 64 average values with regard to the vertical direction.

For example, assuming that the luminance value is represented by 16 bits in the luminance signal Yp. The contrast determining unit 32 obtains average values of higher-order 10 bits of the luminance values. The contrast determining unit 32 can be provided with a line memory for referring to the luminance values in the pixels arranged in the vertical direction.

The contrast determining unit 32 sorts the 64 average values with regard to the horizontal direction in an ascending order by a function "sort(h, h+64)". A minimum value and a maximum value of the 64 average values are respectively defined as h[0] and h[63].

Further, the contrast determining unit 32 sorts the 64 average values with regard to the vertical direction in an ascending order by a function "sort(v, v+64)". A minimum value and a maximum value of the 64 average values are respectively defined as v[0] and v[63].

Subsequently, the contrast determining unit 32 substitutes a larger one of the values h[63] and v[63] for cmax and substitutes a smaller one of the values h[0] and v[0] for cmin. The contrast determining unit 32 substitutes a smaller one of a value obtained by multiplying (cmax+1)/(cmin+1) by a value Samp, and 1024 for the value Scont. The value Samp is an amplifying coefficient. Here, (cmax+1)/(cmin+1) represents a result of measurement of a contrast that is a ratio of a maximum value and a minimum value of the luminance values in the binning block $B_{BIN}$. In this example, the value Scont can be from 1 to 1024.

The value Samp is a coefficient for contrast adjustment, and is stored in a register, for example. The value Samp can be changed as appropriate by setting by a user. The value Samp is assumed to be 1 in this example. 1024 is a constant representing the maximum value of the contrast that can be represented by 10-bit data. As the constant, a value other than 1024 can be set in accordance with the number of bits of data and the value Samp.

Figure 8:
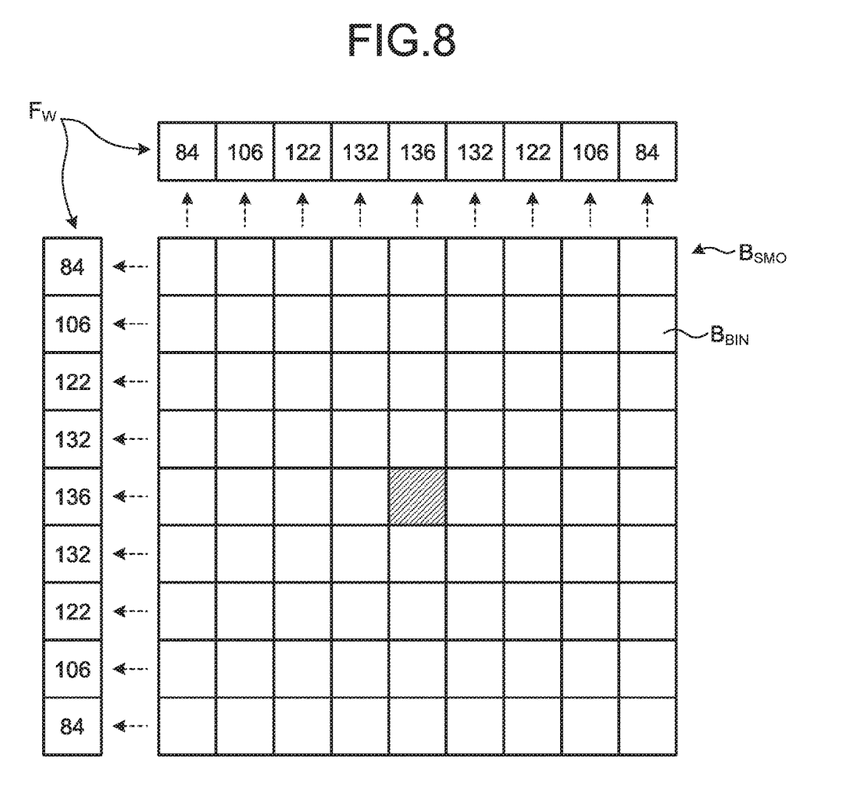
FIGS. 8 and 9 are explanatory diagrams of processing in a filter processing unit illustrated in FIG. 5.
Figure 9:
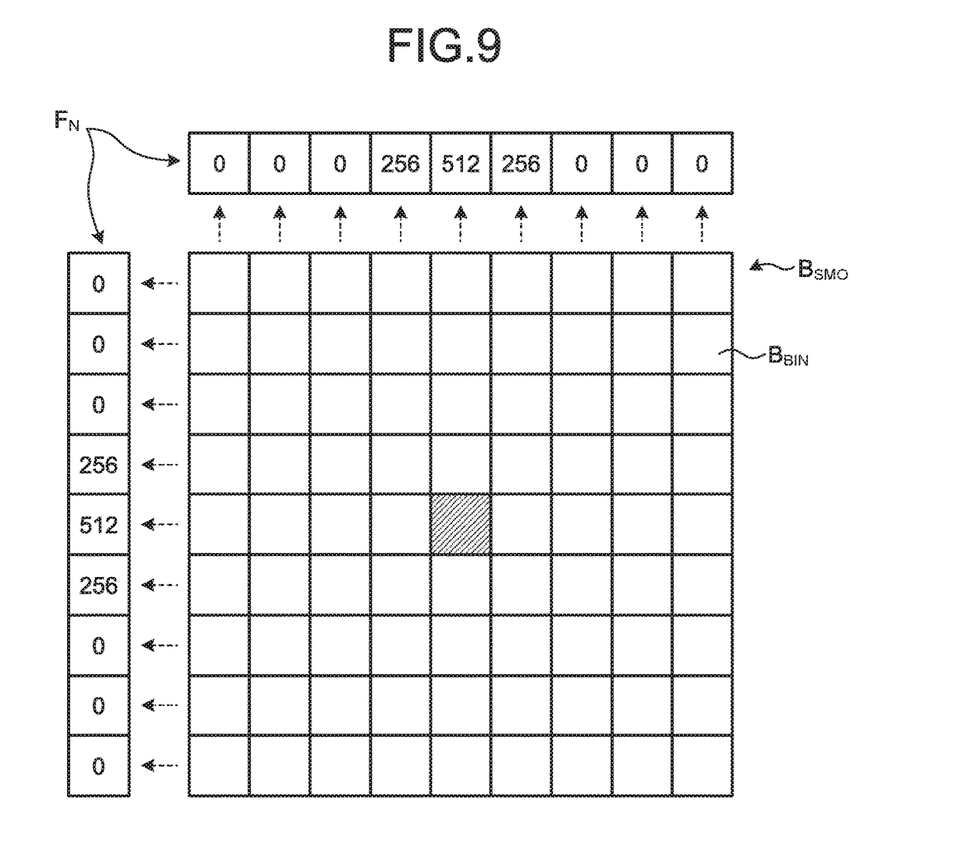

FIGS. 8 and 9 are explanatory diagrams of processing in the filter processing unit 33. FIG. 8 illustrates processing by a first smoothing filter $F_W$. FIG. 9 illustrates processing by a second smoothing filter $F_N$.

In a smoothing block $B_{SMO}$, 9×9 binning blocks $B_{BIN}$ are arranged. The filter processing unit 33 performs two-dimensional filter processing that includes weighting for representative values in the binning blocks $B_{BIN}$ arranged in the horizontal direction and weighting for representative values in the binning blocks $B_{BIN}$ arranged in the vertical direction, to calculate a filter result of a luminance value of a target pixel. The target pixel is included in the binning block $B_{BIN}$ at the center of the smoothing block $B_{SMO}$.

In FIGS. 8 and 9, weighting coefficients in the horizontal direction are illustrated on an upper side of the binning blocks $B_{BIN}$. Weighting coefficients in the vertical direction are illustrated on a left side of the binning blocks $B_{BIN}$.

In the first smoothing filter $F_W$ illustrated in FIG. 8, a weighting coefficient "136" in the horizontal direction is set for a center binning block $B_{BIN}$. For respective binning blocks $B_{BIN}$ arranged in a direction away from the center, weighting coefficients "132", "122", "106", and "84" are set respectively.

Also, in the first smoothing filter $F_W$, a weighting coefficient "136" in the vertical direction is set for the center binning block $B_{BIN}$. For respective binning blocks $B_{BIN}$ arranged in a direction away from the center, weighting coefficients "132", "122", "106", and "84" are set respectively.

In the first smoothing filter $F_W$, weighting coefficients are set in a symmetrical manner in the horizontal direction and the vertical direction. The first smoothing filter $F_W$ can be defined by the five weighting coefficients "136", "132", "122", "106", and "84". These five weighting coefficients are stored in a predetermined register. Each of these weighting coefficients can be changed as appropriate by setting by a user.

The filter processing unit 33 multiplies the representative values in the binning blocks $B_{BIN}$ arranged in the horizontal direction by respective weighting coefficients. The filter processing unit 33 performs bit shift to right by 10 bits for results of multiplication.

The filter processing unit 33 multiplies results of weighting in the horizontal direction by weighting coefficients in the vertical direction. The filter processing unit 33 performs bit shift to right by 10 bits for results of multiplication. In this manner, the filter processing unit 33 obtains a filter result ($Sp_W$) by the first smoothing filter $F_W$ with regard to the binning block $B_{BIN}$ including the target pixel.

In the first smoothing filter $F_W$, weighting coefficients other than "0" are set for all the binning blocks $B_{BIN}$ included in the smoothing block $B_{SMO}$. Information of all 81 binning blocks $B_{BIN}$ is reflected on the result $Sp_W$.

In the second smoothing filter $F_N$ illustrated in FIG. 9, a weighting coefficient "512" in the horizontal direction is set for a center binning block $B_{BIN}$. For binning blocks $B_{BIN}$ adjacent to this center binning block $B_{BIN}$, a weighting coefficient "256" is set. For other binning blocks $B_{BIN}$, a weighting coefficient "0" is set. Also for the vertical direction, respective weighting coefficients "512", "256", and "0" are set similarly to the horizontal direction.

The second smoothing filter $F_N$ can be defined by the five weighting coefficients "512", "256", "0", "0", and "0". These five weighting coefficients are stored in a predetermined register. Each of these weighting coefficients can be changed as appropriate by setting by a user.

The filter processing unit 33 obtains a filter result ($Sp_N$) by the second smoothing filter $F_N$ for the binning block $B_{BIN}$ including the target pixel by the same operation as that in the case of the first smoothing filter $F_W$.

In the second smoothing filter $F_N$, the weighting coefficient "0" is set for binning blocks $B_{BIN}$ away from the center in the horizontal direction and in the vertical direction in the smoothing block $B_{SMO}$. Information of a binning block $B_{BIN}$ around the center of the smoothing block $B_{SMO}$ is reflected on the result $Sp_N$, whereas information of the binning blocks $B_{BIN}$ away from the center is not reflected.

The blending unit 34 obtains a smoothed signal Sp in the binning block $B_{BIN}$ including the target pixel by the following operation, for example. The number of bits shifted can be changed as appropriate in accordance with the number of bits of the value Scont. Further, in accordance with the number of bits of the value Scont, a value other than 1024 can be set as a constant.

$$Sp=((Scont \times Sp_N)+((1024-Scont) \times Sp_W))>>10$$

The smoothing unit 12 outputs the smoothed signal Sp calculated by the blending unit 34. The frame memory 14 illustrated in FIG. 1 holds the smoothed signal Sp.

The smoothing unit 12 calculates, by blending processing, the smoothed signal Sp on which characteristics of the second smoothing filter $F_N$ are more strongly reflected as the contrast in the target pixel and its surroundings is higher. The smoothing unit 12 can form luminance distribution following a luminance change in a portion where the luminance change is large.

The smoothing unit 12 calculates the smoothed signal Sp on which characteristics of the first smoothing filter $F_W$ are more strongly reflected as the contrast in the target pixel and its surroundings is lower. The smoothing unit 12 can form luminance distribution smoothed in a wider range of a portion where the luminance change is small.

The smoothing unit 12 can perform filter processing adapted to a luminance change in every region of an image, as compared with a case where a smoothing filter having constant characteristics is applied irrespective of the luminance change in every region. The smoothing unit 12 can smoothen a luminance image while focusing on both the fine gradation and the smoothness, by an operation suitable for the contrast in every region.

Figure 10:
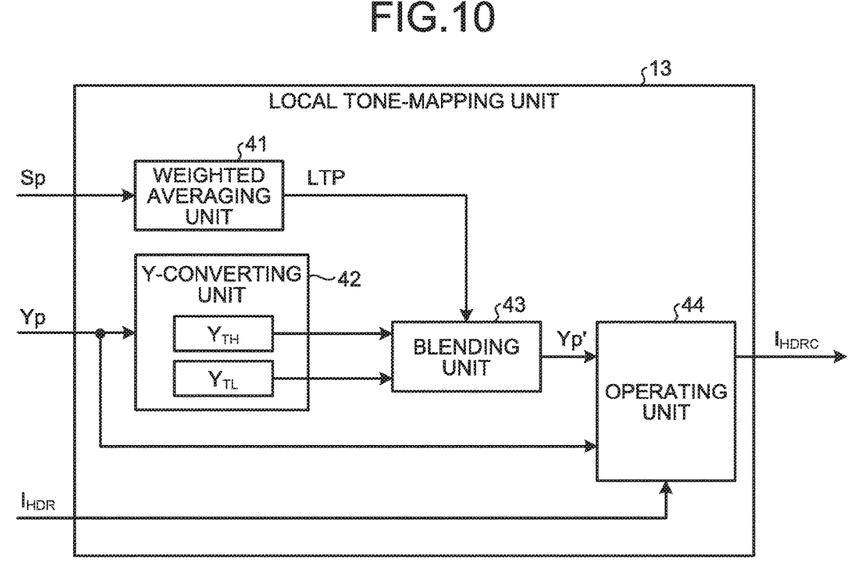
FIG. 10 is a block diagram of a local tone-mapping unit illustrated in FIG. 1.

FIG. 10 is a block diagram of the local tone-mapping unit 13. The local tone-mapping unit 13 is provided with various logic circuits and storage elements to store operation results and various data. The local tone-mapping unit 13 includes a weighted averaging unit 41, a Y-converting unit 42, a blending unit 43, and an operating unit 44 that are processing circuits.

The smoothed signal Sp read out from the frame memory 14 is input to the weighted averaging unit 41. The weighted averaging unit 41 calculates a local tone parameter (LTP) that is a result of weighted averaging of the smoothed signal Sp of each binning block $B_{BIN}$. The parameter LTP is a parameter that indicates luminance of a target pixel after being subjected to smoothing of luminance distribution.

The luminance signal Yp from the Y-image generating unit 11 is input to the Y-converting unit 42. The Y-converting unit 42 performs conversion of the luminance signal Yp based on a relation represented as a first tone curve and conversion of the luminance signal Yp based on a relation represented as a second tone curve. The first tone curve and the second tone curve are different from each other in a range of gradation assigned in an output luminance signal Yp' with respect to a level of the input luminance signal Yp.

In the first tone curve ($T_H$), a wide range of gradation in the luminance signal Yp' is assigned to a relatively high-level range of the luminance signal Yp. The conversion based on the first tone curve is suitable for achieving the fine gradation in a region with from middle to high luminance of an image.

In the second tone curve ($T_L$), a wide range of gradation in the luminance signal Yp' is assigned to a low-level range of the luminance signal Yp. The conversion based on the second tone curve is suitable for achieving the fine gradation in a region with low luminance of the image.

The Y-converting unit 42 outputs a first mapping result ($Y_{TH}$) by local tone mapping using the first tone curve and a second mapping result ($Y_{TL}$) by local tone mapping using the second tone curve. The result $Y_{TH}$ is a conversion result of the luminance signal Yp based on a relation represented as the first tone curve ($T_H$). The result $Y_{TL}$ is a conversion result of the luminance signal Yp based on a relation represented as the second tone curve ($T_L$).

The blending unit 43 performs blending processing on the results $Y_{TH}$ and $Y_{TL}$. The blending unit 43 adjusts the ratio of blending the results $Y_{TH}$ and $Y_{TL}$ in accordance with the parameter LTP obtained by referring to the smoothed signal Sp. The blending unit 43 outputs a luminance signal Yp' that is a result of blending the results $Y_{TH}$ and $Y_{TL}$.

The luminance signals Yp and Yp' and the HDR image signal ($I_{HDR}$) are input to the operating unit 44. The operating unit 44 calculates the HDRC image signal ($I_{HDRC}$) by performing compression processing on the signal $I_{HDR}$ in accordance with the luminance signals Yp and Yp'.

Next, processing in the local tone-mapping unit 13 is described. The local tone-mapping unit 13 obtains, for each target pixel, the parameter LTP that is a result of weighted averaging of values of the smoothed signals Sp in the respective binning blocks $B_{BIN}$. The local tone-mapping unit 13 regards the smoothed signal Sp as the parameter LTP for a target pixel at the center of the binning block $B_{BIN}$, and performs interpolation of the parameter LTP for this center target pixel in the weighted averaging unit 41. The local tone-mapping unit 13 reduces a change of the parameter LTP between the binning blocks $B_{BIN}$ by interpolation of the parameter LTP in accordance with the position of the target pixel. The local tone-mapping unit 13 can suppress a rapid change of characteristics of mapping between the binning blocks $B_{BIN}$ and can reduce artifact of an HDRC image.

Figure 11:
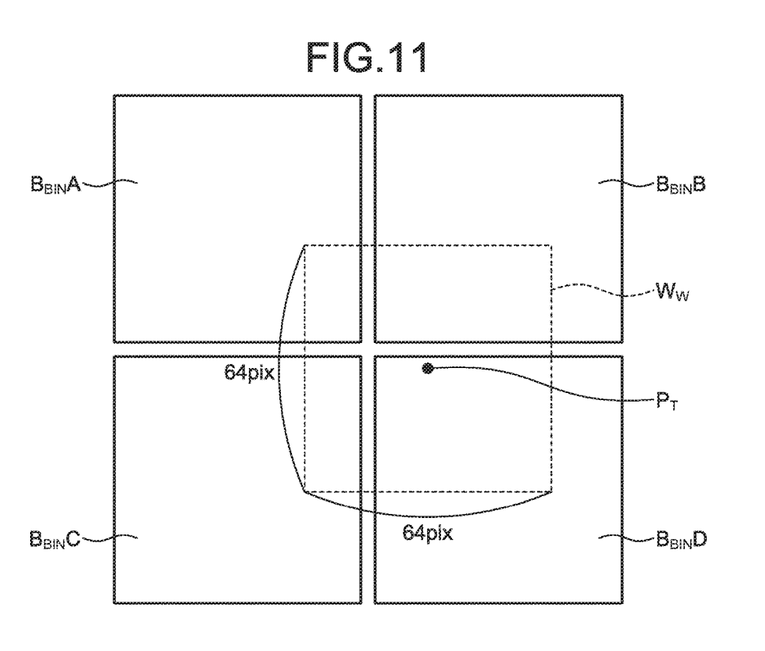
FIG. 11 is an explanatory diagram of processing in a weighted averaging unit illustrated in FIG. 10.

FIG. 11 is an explanatory diagram of processing in the weighted averaging unit 41. The weighted averaging unit 41 calculates the parameter LTP for every target pixel based on the smoothed signal Sp in each binning block $B_{BIN}$. The weighted averaging unit 41 sets a window corresponding to a target pixel. The window is a region centered at the target pixel. The window is set to be a region having the same size as the binning block $B_{BIN}$ in a pixel array, for example. The weighted averaging unit 41 obtains the parameter LTP that is an average value of values of the smoothed signals Sp by taking into account weights corresponding to the number of pixels in a region in which the window and the binning block $B_{BIN}$ overlap each other.

In the example illustrated in FIG. 11, a target pixel $P_T$ is located in a certain binning block $B_{BIN}$D. A window $W_W$ centered at this target pixel $P_T$ has regions respectively overlapping the binning block $B_{BIN}$D and its surrounding binning blocks $B_{BIN}$A, $B_{BIN}$B, and $B_{BIN}$C.

The weighted averaging unit 41 obtains the parameter LTP for this target pixel $P_T$ by the following operation. Assuming X=A, B, C, and D, SpX is a value of a smoothed signal Sp of a binning block $B_{BIN}$X. $P_N$X is the number of pixels in a region where the window $W_W$ and the binning block $B_{BIN}$X overlap each other. In the following operation expression, "64×64" represents the number of pixels in the window $W_W$. The bit shift to right by 12 bits can be substituted for the division by "64×64".

$$LTP=(SpA \times P_NA+SpB \times P_NB+SpC \times P_NC+SpD \times P_ND)/(64 \times 64)$$

The weighted averaging unit 41 is not limited to the one that obtains a weighted average of the smoothed signals Sp in four binning blocks $B_{BIN}$. It suffices that the weighted averaging unit 41 obtains a weighted average of smoothed signals Sp in a plurality of binning blocks $B_{BIN}$. The weighted averaging unit 41 can refer to an area of a region where a window and the binning block $B_{BIN}$ overlap each other, for example, in place of the number of pixels in the overlapping region. The weighted averaging unit 41 can obtain the parameter LTP that can interpolate the smoothed signals Sp in the respective binning blocks $B_{BIN}$ by any method.

Figure 12:
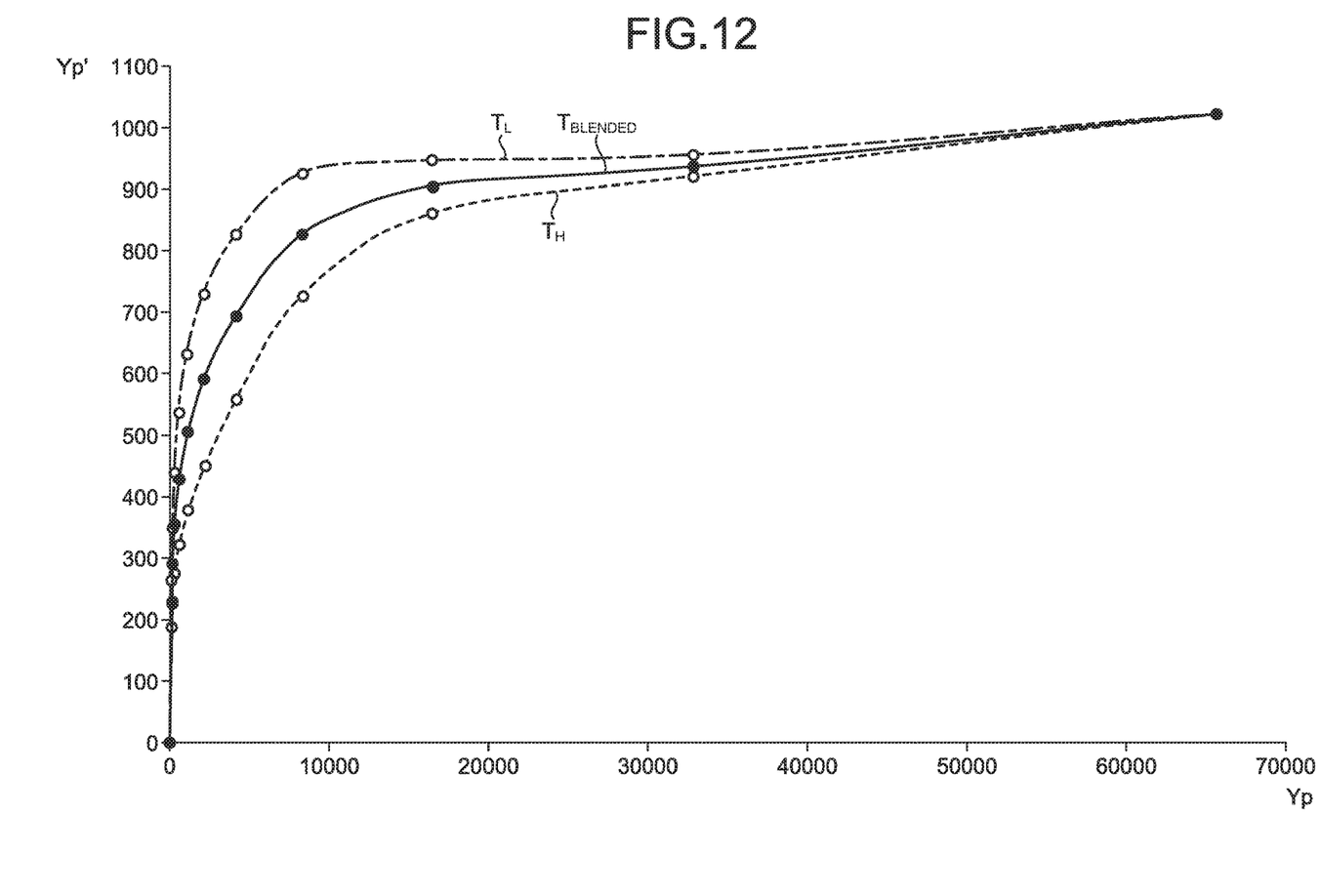
FIG. 12 is an explanatory diagram of processing in a Y-converting unit and a blending unit illustrated in FIG. 10.

FIG. 12 is an explanatory diagram of processing in the Y-converting unit 42 and the blending unit 43. The horizontal axis in the graph illustrated in FIG. 12 represents a value of the luminance signal Yp input to the Y-converting unit 42. The vertical axis represents a value of the luminance signal Yp' after being subjected to the respective processing in the Y-converting unit 42 and the blending unit 43.

In the graph, $T_{BLENDED}$ represents an example of characteristics of conversion from the luminance signal Yp to the luminance signal Yp'. $T_H$ represents characteristics of conversion of the luminance signal Yp by the first tone curve. $T_L$ represents characteristics of conversion of the luminance signal Yp by the second tone curve.

The Y-converting unit 42 outputs, for the luminance signal Yp input thereto, the result $Y_{TH}$ that is the result of conversion in accordance with the first tone curve and the result $Y_{TL}$ that is the result of conversion in accordance with the second tone curve. It is assumed that the number of bits of data per pixel in the results $Y_{TH}$ and $Y_{TL}$ is less than the number of bits of data per pixel in the luminance signal Yp. For example, the number of bits in the luminance signal Yp is 16 bits, while the number of bits in the results $Y_{TH}$ and $Y_{TL}$ is 10 bits.

The blending unit 43 obtains the luminance signal Yp' by the following operation, for example. The number of bits shifted can be changed as appropriate in accordance with the number of bits in the results $Y_{TH}$ and $Y_{TL}$. Further, in accordance with the number of bits of the results $Y_{TH}$ and $Y_{TL}$, a value other than 1024 can be set as a constant.

$$Yp'=(Y_{TH} \times LTP + Y_{TL} \times (1024-LTP)) >> 10$$

The characteristics $T_{BLENDED}$ change between the characteristics $T_H$ and $T_L$ in accordance with the parameter LTP. As the parameter LTP is larger, the characteristics $T_{BLENDED}$ become closer to the characteristics $T_H$. The blending unit 43 outputs, with regard to a target pixel located in a region with from middle to high luminance, the luminance signal Yp' on which characteristics of the first tone curve are more strongly reflected. Further, as the parameter LTP is smaller, the characteristics $T_{BLENDED}$ become closer to the characteristics $T_L$. The blending unit 43 outputs, with regard to a target pixel located in a region with low luminance, the luminance signal Yp' on which characteristics of the second tone curve are strongly reflected. The local tone-mapping unit 13 converts a luminance signal in accordance with a luminance level in every region of an image.

The operating unit 44 performs conversion from a pixel value $P_{HDR}$ in an HDR image to a pixel value $P_{HDRC}$ in an HDRC image by the following operation.

$$P_{HDRC} = P_{HDR} \times (Yp'/Yp)$$

The operating unit 44 multiplies the pixel value $P_{HDR}$ by Yp'/Yp that indicates a compression ratio of data in a luminance space, to reduce a dynamic range of the signal $I_{HDR}$ to a dynamic range of the signal $I_{HDRC}$.

Figure 13:
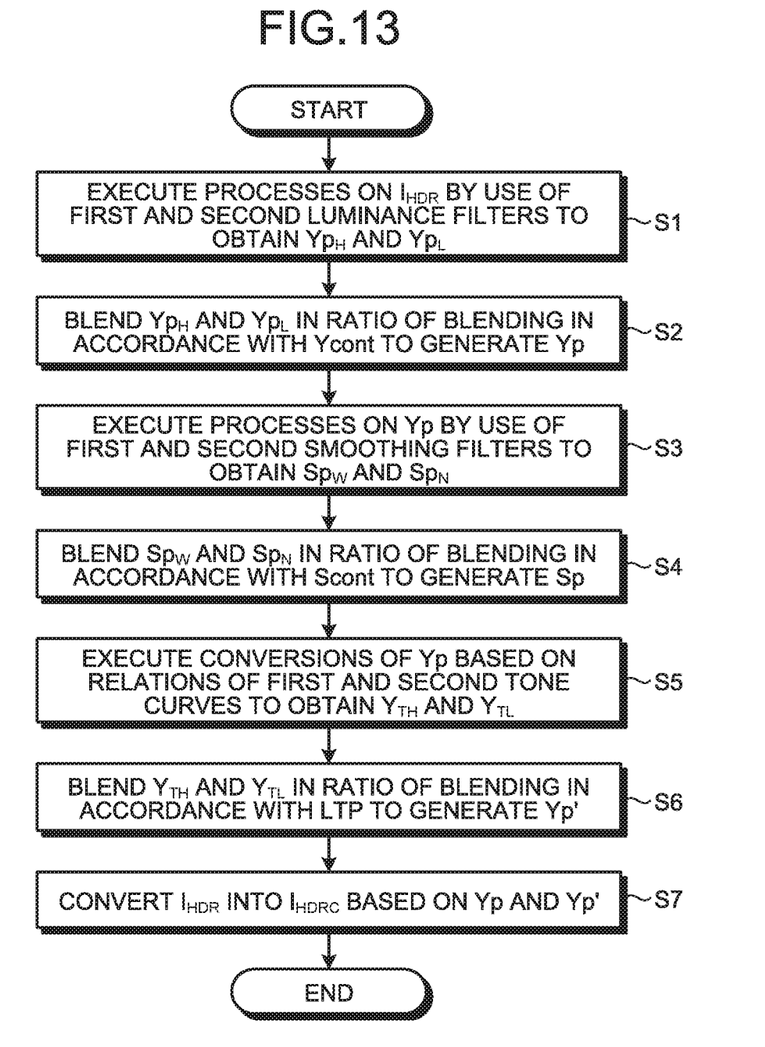
FIG. 13 is a flowchart illustrating a procedure of image processing according to the embodiment.

FIG. 13 is a flowchart illustrating a procedure of image processing according to the embodiment. The filter processing unit 23 executes the processes on a signal $I_{HDR}$ by use of respective first and second luminance filters, to obtain results $Yp_H$ and $Yp_L$ (S1). The blending unit 24 blends the results $Yp_H$ and $Yp_L$ in the ratio of blending in accordance with a value Ycont, to generate a luminance signal Yp (S2). The filter processing unit 33 executes the processes on a luminance signal Yp by use of respective first and second smoothing filters, to obtain results $Sp_W$ and $Sp_N$ (S3). The blending unit 34 blends the results $Sp_W$ and $Sp_N$ in the ratio of blending in accordance with a value Scont, to generate a smoothed signal Sp (S4).

The Y-converting unit 42 executes the conversions of a luminance signal Yp based on a relation of a first tone curve and a relation of a second tone curve respectively, to obtain results $Y_{TH}$ and $Y_{TL}$ (S5). The blending unit 43 blends the results $Y_{TH}$ and $Y_{TL}$ in the ratio of blending in accordance with a parameter LTP, to generate a luminance signal Yp' (S6). The parameter LTP is a result of weighted averaging of the smoothed signal Sp. The operating unit 44 converts the signal $I_{HDR}$ into a signal $I_{HDRC}$ based on the luminance signals Yp and Yp' (S7). Due to this operation, the HDRC device 10 ends the image processing illustrated in FIG. 13.

The image processing method according to the embodiment is not limited to the one executed by the hardware configuration illustrated in FIG. 1, and may be executed by software. The HDRC device 10 can be configured as hardware to which an image processing program for realizing the image processing method is installed. Functions, which are equal to ones provided by the Y-image generating unit 11, the smoothing unit 12, the local tone-mapping unit 13, and the frame memory 14, may be realized by using the hardware to execute the image processing program.

Figure 14:
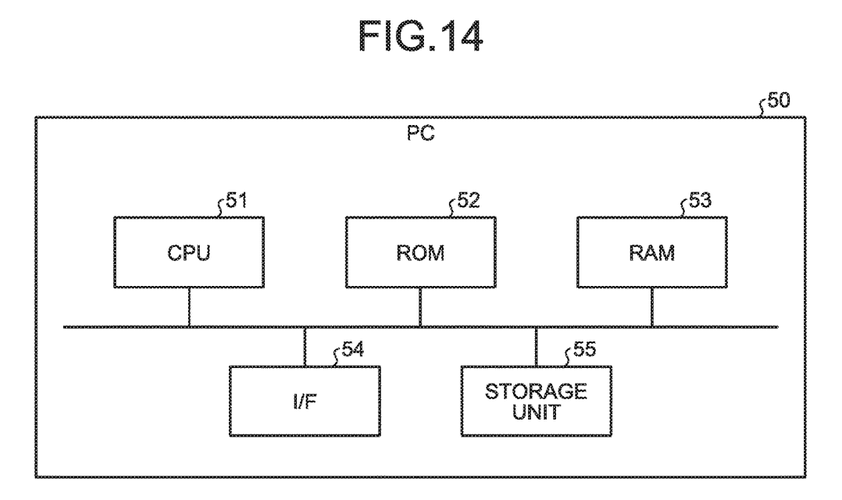
FIG. 14 is a block diagram illustrating a personal computer to execute an image processing method according to the embodiment.

FIG. 14 is a block diagram illustrating a personal computer (PC) 50 that is an example of hardware to execute an image processing method according to the embodiment. The PC 50 includes a CPU (Central Processing Unit) 51, a ROM (Read Only Memory) 52, a RAM (Random Access Memory) 53, an interface (I/F) 54, and a storage unit 55, and a bus that connects these components in a communicable manner.

An image processing program is stored in the ROM 52 and is loaded to the RAM 53 via the bus. The CPU 51 develops the program in a program storage region within the RAM 53 and performs various types of processing. A data storage region in the RAM 53 is used as a work memory when the various types of processing are performed.

The I/F 54 is a connection interface with an external device such as an HDR synthesizing device. Also, the I/F 54 receives input of information related to a setting condition of the HDRC device 10. The storage unit 55 that is an external storage device stores therein an HDRC image signal ($I_{HDRC}$). The hardware to execute the image processing method can be a dedicated chip capable of executing the image processing program, for example.

Figure 15:
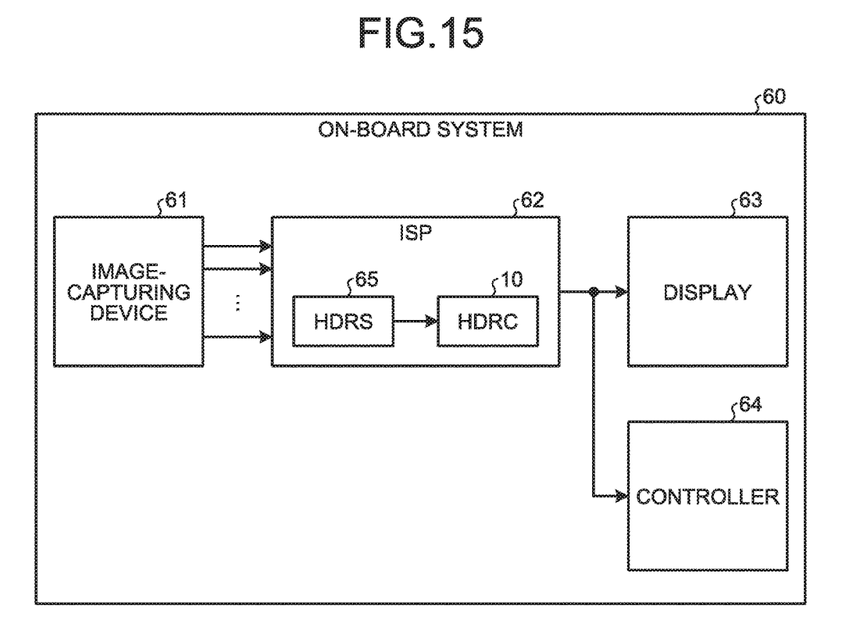
FIG. 15 is a block diagram of an on-board system including the HDRC device 10 illustrated in FIG. 1.

FIG. 15 is a block diagram of an on-board system 60 including the HDRC device 10. The on-board system 60 performs presentation of information in accordance with a captured image and executes control of a vehicle. The on-board system 60 is a system that supports a driving operation by a driver, an automated driving system that controls automated driving of a vehicle, and the like.

The on-board system 60 includes an image-capturing device 61, an image signal processor (ISP) 62, a display 63, and a controller 64. The ISP 62 includes an HDR synthesizing (HDRS) device 65 and the HDRC device 10. The HDRC device 10 includes the hardware configuration illustrated in FIG. 1, for example.

The image-capturing device 61 includes an image sensor and captures an image in a field of view from a vehicle. The image-capturing device 61 performs capturing multiple times with mutually different photosensitivities and outputs a plurality of image signals. The ISP 62 performs processing on the image signals from the image-capturing device 61.

In the ISP 62, the HDRS device 65 performs HDR synthesis of the image signals to output an HDR image signal ($I_{HDR}$) in accordance with a frame rate. The HDRC device 10 performs HDR compression for the signal $I_{HDR}$ to output an HDRC image signal ($I_{HDRC}$). The ISP 62 can perform image processing other than HDR synthesis and HDR compression. The HDRS device 65 and the HDRC device 10 may be included in the image-capturing device 61, for example in the image sensor, in place of the ISP 62.

The display 63 displays various types of information related to support of a driving operation of a vehicle or a driving condition of a vehicle based on data from the ISP 62. The controller 64 performs processing for supporting the driving operation of the vehicle or controlling the vehicle based on data from the ISP 62.

According to the embodiment, the HDRC device 10 acquires a luminance signal by blending a result of filtering using a first luminance filter and a result of filtering using the second luminance filter. The HDRC device 10 can perform filter processing adapted to a luminance change in every region. Therefore, the HDRC device 10 can obtain an HDR compressed image maintained the fine gradation and reduced noise by HDR compression suitable for luminance distribution in every region of an image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
   circuitry configured to
      acquire a luminance signal of a target pixel in an image by performing filter processing on an image signal, the luminance signal being generated by blending a first luminance-filter result obtained by a first luminance filter and a second luminance-filter result obtained by a second luminance filter,
      perform local tone mapping of the luminance signal, and
      adjust a ratio of blending the first luminance-filter result and the second luminance-filter result in accordance with a result of evaluation of a contrast in a region of the image, including the target pixel.

2. The image processing device according to claim 1, wherein the first luminance filter and the second luminance filter are different from each other in transfer characteristics with respect to a change of a luminance value.

3. The image processing device according to claim 1, wherein the circuitry uses a result of binning processing on the image signal in an operation for evaluating the contrast.

4. An image processing device comprising:
   circuitry configured to
      acquire a luminance signal of a target pixel in an image by performing filter processing on an image signal, the luminance signal being generated by blending a first luminance-filter result obtained by a first luminance filter and a second luminance-filter result obtained by a second luminance filter,
      perform local tone mapping of the luminance signal, and
      blend a first mapping result and a second mapping result, the first mapping result being a conversion result of the luminance signal based on a relation represented as a first tone curve, the second mapping result being a conversion result of the luminance signal based on a relation represented as a second tone curve.

5. The image processing device according to claim 4, the circuitry further configured to
   perform processing of smoothing luminance distribution of the image on the luminance signal to generate a smoothed signal, and
   adjust a ratio of blending the first mapping result and the second mapping result by referring to the smoothed signal.

6. The image processing device according to claim 5, wherein the circuitry generates the smoothed signal by blending a first smoothing-filter result obtained by a first smoothing filter and a second smoothing-filter result obtained by a second smoothing filter.

7. The image processing device according to claim 6, wherein the circuitry adjusts a ratio of blending the first smoothing-filter result and the second smoothing-filter result in accordance with a result of evaluation of a contrast in a region of the image, including the target pixel.

8. An image processing device comprising:
   circuitry configured to
      acquire a luminance signal of a target pixel in an image,
      generate a smoothed signal by performing filter processing on the luminance signal to smooth luminance distribution of the image, the smoothed signal being generated by blending a first smoothing-filter result obtained by a first smoothing filter and a second smoothing-filter result obtained by a second smoothing filter, and
      perform local tone mapping of the luminance signal by referring to the smoothed signal.

9. The image processing device according to claim 8, wherein the circuitry adjusts a ratio of blending the first smoothing-filter result and the second smoothing-filter result in accordance with a result of evaluation of a contrast in a region of the image, including the target pixel.

10. The image processing device according to claim 9, wherein the circuitry performs filter processing using a result of binning processing on the luminance signal, and performs an operation for evaluating the contrast by referring to data in a process of an operation in the binning processing.

11. The image processing device according to claim 8, wherein a range in which luminance distribution is referred to in processing using the first smoothing filter is different from a range in which luminance distribution is referred to in processing using the second smoothing filter.

12. The image processing device according to claim 8, wherein the circuitry performs filter processing using a result of binning processing on the luminance signal, and generates the smoothed signal for a binning range in the binning processing.

13. The image processing device according to claim 8, wherein the circuitry blends a first mapping result and a second mapping result,
   the first mapping result is a conversion result of the luminance signal based on a relation represented as a first tone curve, and
   the second mapping result is a conversion result of the luminance signal based on a relation represented as a second tone curve.

14. The image processing device according to claim 13, wherein the circuitry adjusts a ratio of blending the first mapping result and the second mapping result in accordance with a parameter based on the smoothed signal.

15. The image processing device according to claim 14, wherein
   the circuitry performs filter processing using a result of binning processing on the luminance signal, generates the smoothed signal for a binning range in the binning processing, and adjusts the ratio of blending in accordance with the parameter for the target pixel by weighted averaging of the smoothed signals in a plurality of binning ranges.

16. The image processing device according to claim 8, wherein the circuitry generates the luminance signal by blending a first luminance-filter result obtained by a first luminance filter and a second luminance-filter result obtained by a second luminance filter.

17. The image processing device according to claim 16, wherein the circuitry adjusts a ratio of blending the first luminance-filter result and the second luminance-filter result in accordance with a result of evaluation of a contrast in a region of the image, including the target pixel.

18. The image processing device according to claim 16, wherein the first luminance filter and the second luminance filter are different from each other in transfer characteristics with respect to a change of a luminance value.

19. An image processing method comprising:
  obtaining a first luminance-filter result for a target pixel in an image by performing filter processing using a first luminance filter for an image signal;
  obtaining a second luminance-filter result for the target pixel by performing filter processing using a second luminance filter for an image signal;
  generating a luminance signal of the target pixel by blending the first luminance-filter result and the second luminance-filter result;
  obtaining a first smoothing-filter result by performing filter processing using a first smoothing filter for the luminance signal;
  obtaining a second smoothing-filter result by performing filter processing using a second smoothing filter for the luminance signal;
  generating a smoothed signal that is the luminance signal after being subjected to smoothing of luminance distribution of the image, by blending the first smoothing-filter result and the second smoothing-filter result; and
  performing local tone mapping of the luminance signal by referring to the smoothed signal.

* * * * *